United States Patent Office 2,932,652
Patented Apr. 12, 1960

2,932,652

3-(1'-(α-NAPHTHYL)3'-OXO-BUTYL)4-HYDROXY COUMARIN AND SALTS THEREOF

Nicholas M. Molnar, New York, N.Y.

No Drawing. Application February 11, 1957
Serial No. 639,235

4 Claims. (Cl. 260—343.2)

This invention relates to a novel compound having blood anti-coagulating properties and useful especially as a rodenticide; and also a novel compound useful as an intermediate for the preparation thereof. In particular, this invention is directed to 3-(1'-α-naphthyl-3'-oxobutyl)-4-hydroxy coumarin.

Accordingly, it is among the primary objects of this invention to provide the novel compound 3-(1'-α-naphthyl - 3' - oxo - butyl) - 4 - hydroxy coumarin having the formula

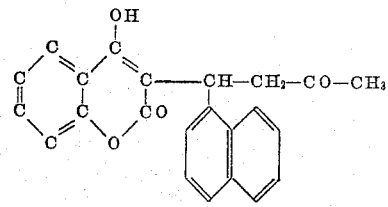

A further object of this invention is to provide a rodenticidal composition comprising a carrier, for example a material acceptable by rodents as edible, and as the active rodenticidal ingredient, the aforesaid-mentioned coumarin derivative.

Further objects and advantages will become evident from the following examples and description of the invention.

EXAMPLE 1

*α-Naphthal acetone*

19 grams of α-naphthaldehyde (having a boiling point of range 195–198° C.) and 24.5 cc. of acetone were placed in a 100 cc. flask and stirred, then 13 cc. of water were added thereto. 3 cc. of a 10% aqueous NaOH solution was gradually added thereto, while the mixture was immersed in a cold water bath. This addition was made during the course of one half hour while the temperature was maintained at not in excess of 25° C. The mixture was then stirred for three hours, following which dilute hydrochloric acid (approximately 10% concentration) was added until it showed an acidic reaction to Congo red. The mixture stratified. The lower oily layer was removed, some benzene being added to accelerate the separation of water. The benzene was distilled under atmospheric pressure and the residue then distilled under vacuum. The main portion, boiling at 176–178° C. at 7 mm., amounted to about 14 grams. This distillate, the naphthal acetone, having the structure

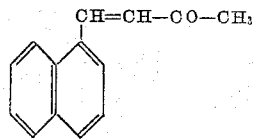

forms a viscous light yellow liquid having a faint odor.

EXAMPLE 2

*3-(1'-α-naphthyl-3'-oxo-butyl)-4-hydroxy coumarin*

7.82 grams of 4-hydroxy coumarin, 9.5 grams of α-naphthal acetone (the product of Example 1) and 70 cc. of a redistilled pyridine were mixed and heated for 20 hours under reflux, following which the mixture was poured into 500 cc. of water. The resulting resinous mass was made distinctly acid with HCl and allowed to stand over night. Supernatant liquid was discarded and the residue washed with cold water, following which it was dissolved in 600 cc. of a cold 0.5% aqueous solution of NaOH by long continued stirring.

The clear solution was decanted or filtered, from the insoluble residue; and dilute HCl (10% conc.) was carefully added while stirring until a permanent precipitate just started to come down, which was at a high pH, of about 13.0. The solution was extracted twice with carbon tetrachloride. The extracted solution was clarified with filter aid and then completely precipitated with dilute HCl. The almost white precipitate was then filtered off, washed with water and dried. There was thus produced 8 grams of a white microcrystalline powder (the product of this example), having a melting point of 138–140° C. and a neutralization value of 355 (theoretical 358).

Bio-assays establishing the excellent rodenticidal action of the aforesaid coumarin derivative were carried out in accordance U.S. Government Military Specification No. MIL-R-11261 (QMC) dated July 9, 1951, particularly sections 4.3.4 through 4.3.4.2.3, thereof using in place of the warfarin therein mentioned, the coumarin derivative of this invention.

The bio-assays carried out with a group of thirty (30) animals showed the following: six died on the third day; six died on the fourth day; six died on the fifth day; three died on the sixth day; three died on the seventh day; three died on the eighth day; two died on the ninth day and one, the last, died on the tenth day.

These results indicate that at the dosage level tested my novel rodenticide produced better results than the minimum requirements established for the rodenticide set forth in the aforementioned military specification. It is noteworthy further that the toxicity of my novel rodenticide to higher animals, such as cats and dogs, is markedly lower than that of heretofore known rodenticides derived from coumarin.

My novel rodenticide may be used in a variety of ways, for example, by incorporating the same in a bait (in a concentration of 0.025%) which can be prepared from a concentrate which comprises a suitable vehicle or carrier, for example cornstarch, containing the active ingredient in an amount of 0.5%. The compound may also be used in soluble form. For example, the sodium salt, or the ammonium or triethanolamine salts or other suitable water-soluble salts in aqueous solutions may be incorporated in drinking water for the rodents, to provide such drinking water with an active ingredient content of 0.025%.

It will be understood that the foregoing description of the invention and the examples and uses thereof are merely illustrative thereof. Accordingly, the appended claims are to be construed as defining the invention within the full spirit and scope thereof.

I claim:

1. Members of the group consisting of 3-(1'-α-naphthyl-3'-oxo-butyl)-4-hydroxy coumarin, and the water-soluble salts thereof, said salts being selected from the group consisting of sodium, triethanolamine and ammonium.

2. The sodium salt in accordance with claim 1.

3. A triethanolamine salt in accordance with claim 1.

4. The ammonium salt in accordance with claim 1.

(References on following page)

References Cited in the file of this patent

UNITED STATES PATENTS

| | | |
|---|---|---|
| 2,427,578 | Stahmann et al. | Sept. 16, 1947 |
| 2,723,276 | Grussner et al. | Nov. 8, 1955 |

OTHER REFERENCES

Ikawa et al.: J. Chem. Soc., vol. 66, pp. 902–6 (1944).

Elsevier's Ency. of Org. Chem., vol. 12B, p. 2238 Elsevier (1950).